United States Patent Office 3,255,042
Patented June 7, 1966

---

3,255,042
PROCESS FOR PURIFYING RETROGRADED AMYLOSE
Robert A. Schnell and Frank Verbanac, Decatur, Ill., assignors to A. E. Staley Manufacturing Company, Decatur, Ill., a corporation of Delaware
No Drawing. Filed June 28, 1963, Ser. No. 291,255
12 Claims. (Cl. 127—69)

This invention relates to the separation of the amylaceous components of starch, that is, the separation of amylose and amylopectin. More particularly, our invention relates to the separation and purification of retrograded amylose from starch.

Ordinary starch is known to consist of two types of polymers of glucose, the linear polymer called amylose (sometimes referred to as the "A-fraction"), and the branched chain polymer called amylopectin (sometimes referred to as the "B-fraction"). The relative content of amylose and amylopectin varies with the source of the starch. For example, depending somewhat on the analytical technique used, it has been estimated that tapioca contains about 17–21% amylose, potato starch 22–25%, corn starch 22–30%, and so on. The amylose molecule is considered to be a long, linear chain of anhydroglucose units. The amylopectin molecule, on the other hand, is considered to be a larger, complex chain of tree-like structures with many of the branches themselves having branches, and so on.

Many methods have been suggested for separating the starch fractions. One such method is described in an article by Lansky et al., in Journal of American Chemical Society, Volume 71, pages 4066–4075 (1949). This method which utilizes a complexing agent consists of gelatinizing starch in a mixture of pentasol, water and a minor amount of a phosphate buffer. The gelatinized material is then refluxed at about 92° C. for several hours and then cooled to obtain a complexed amylose in crystalline form. A more recent method in which no complexing agent is utilized is described in U.S. Patent 3,067,-067 to J. A. Wagoner et al. Briefly stated, the process of the patent is carried out by forming a fluid solution of starch and water by heating it above 250° F. while regulating the temperature and time of heating to avoid degradation of the starch. The fluid solution is then cooled below the atmospheric boiling point and above about 120° F. while the concentration of the starch dry substance in the cooled solution is maintained at more than about 2.5% by weight and the temperature is maintained in a range between about 120° F. and the atmospheric boiling point of water for a period of time sufficient to stabilize the solution. During this period of time a separable amylose-rich solid fraction is formed and grown. The amylose-rich solid fraction is then separated from the stable solution and is recovered in solid form. The amylopectin remains dissolved in the stable solution and can then be recovered by methods shown in the Wagoner et al. patent.

Amylose such as that obtained by the Wagoner et al. process differs from the complexed amylose of Lansky et al. Amylose produced by the Wagoner et al. process is in the retrograded form, while the complexed amylose produced by the pentasol-water treatment is in the non-retrograded form. However, the complexed amylose can be made to retrograde by prolonged exposure to moisture. Retrograded amylose is characterized by having a much lower solubility in water than the non-retrograded amylose. The low solubility of retrograded amylose is believed to be caused by a high degree of hydrogen bonding which in turn causes compaction of the amylose molecules and thus greatly decreases water solubility. The phenomenon of retrogradation is described in Kerr, Chemistry and Industry of Starch, Academic Press (1950), pages 165–167.

Amylose which has been obtained by either of the above-described methods contains an undesirable amount of impurities, and in addition, can contain some branched-chain material. The Lansky et al. article describes a method for recrystallizing the complexed material which serves to reduce the level of fatty impurities. This purification treatment consists of dissolving the complexed amylose in boiling water containing an excess amount of butanol. The resulting solution is then centrifuged to remove undissolved solid material and cooled to obtain solid amylose. While the Lansky et al. process serves to adequately purify non-retrograded complexed amylose, it cannot be satisfactorily applied to retrograded amylose such as that obtained by the process of the above-mentioned patent.

The principal impurity in amylose is fatty material. When either corn starch or sorghum starch is the raw material source, separated amylose usually contains from about 1.5 to 2.5% by weight of fatty material. Amylose derived from other cereal starch sources contains fatty material in the range of 0.5 to 2.0% by weight. The presence of fatty impurities along with nitrogen, inorganic material and as yet unidentified impurities restricts the use of amylose in situations where a product of high purity is desired.

The principal object of this invention is to provide a method for removing fatty material and other impurities from retrograded amylose.

Another object of our invention is to provide a method for removing fatty material and other impurities from retrograded amylose utilizing a mixture of water and butanol.

An additional object of our invention is to provide a method for obtaining substantially fat-free amylose from retrograded corn amylose.

The word "starch" is used herein in a generic sense. Any variety of starch or mixtures of starch may be employed in our process, including corn, rice, wheat, sorghum, etc. and the like. Where removal of fatty material is the principal object, our process is most advantageously applied to retrograded corn amylose or sorghum amylose simply because they contain the highest proportions of fatty impurities.

Generally stated, our process is carried out by first separating starch into an amylopectin-rich fraction and an amylose-rich fraction. This can be accomplished according to the process disclosed in the previously mentioned patent. The impure retrograded amylose obtained by the fractionation of starch is then dissolved in a mixture comprised of water and an aliphatic alcohol having from 4 to 6 carbon atoms inclusive, such as hexanol, pentasol and butanol, at temperatures above 250° F. The resulting fluid solution is then cooled below the atmospheric boiling point of the water-alcohol mixture and above 120° F. and maintained within that range for a period of time sufficient to form an upper alcohol layer saturated with water, hereinafter called the alcohol layer, and a lower water layer saturated with alcohol, hereinafter called the water layer, and for a period of time sufficient to form and grow solid amylose in the water layer. The solid amylose is then separated from the water layer and dried to obtain substantially fat free amylose.

In an alternative procedure, the amylose can be separated from the water layer before formation of solid material in the water layer. This can be accomplished by treating the water layer containing the dissolved amylose with a water miscible organic solvent in which amylose is insoluble to precipitate solid amylose. The precipitated amylose is then separated from the solvent system and dried to obtain substantially fat free amylose.

We have discovered that by our process more than 90% of the fat in impure retrograded amylose can be removed. In addition, when carried out according to the preferred method of our invention, any additional branched-chain polymer can be separated from the amylose and this material can be added to the amylopectin fraction to increase the amount of that material recovered.

In order to obtain satisfactory purification of retrograded amylose it is necessary in the solution forming step of our process to utilize temperatures above 250° F. It is also necessary, in order to avoid substantial degradation of the amylose, to limit the temperature and time of heating. In order to obtain satisfactory removal of impurities, it is necessary that sufficient alcohol be utilized so that a separable alcohol layer is obtained during the cooling step of our process. We have found that not less than 8% by weight alcohol, based on the weight of the water in the water-alcohol mixture, should be employed to obtain a separable alcohol layer. Generally, in order to obtain optimum purification of the retrograded amylose, amounts of alcohol ranging from about 12 to about 25% by weight are preferred. The upper amount of alcohol that can be theoretically employed in our process is governed by the solubility of alcohol in water. If more than about 900% by weight alcohol is utilized, a separable water layer containing amylose will not be formed. It is generally uneconomical to use in excess of about 25–30% by weight of alcohol.

It has been found that when more than about 9% by weight of impure amylose dry substance based on the weight of the water in the water-alcohol mixture is subjected to our process, the solid amylose formed in the cooling step is uniformly dispersed throughout the water layer and the water layer is too viscous to allow recovery of previously unseparated branched-chain material. In our preferred method it is desired to recover any additional branched-chain material, therefore less than 9% by weight of impure amylose is preferably employed. It has also been found that optimum removal of impurities and additional recovery of branched-chain material is most easily and economically accomplished when from about 3 to about 7% by weight of impure amylose is employed. While amounts of amylose greater that 9% can be satisfactorily employed to remove impurities other than branched-chain material, it has been found that our process becomes inefficient in removing fatty impurities when more than about 15% by weight impure amylose is utilized.

As previously stated, the minimum temperature to form the fluid solution is 250° F. The temperature above 250° F. to which the fluid solution is heated and the time at the temperature both must be regulated to avoid degradation of the amylose. The higher the temperature or the longer the holding time at the temperature, the greater is the tendency for the amylose to be degraded. At a minimum, the mixture containing the impure retrograded amylose must be kept at above 250° F. until all of the amylose is in solution. Then as the temperature is increased, or the time above 250° F. is increased, the other should be decreased. Generally it has been found that temperatures between about 250° F. and 350° F. may be used when holding times ranging from about 1 to about 30 minutes are employed. In order to hold degradation to a minimum, a temperature of from about 270–320° F. and a holding time of from about 1 to about 10 minutes have been found desirable. Temperatures in excess of 370° F. should be avoided.

It is desirable in our process to bring the mixture containing the impure amylose to above 250° F. rapidly and for this purpose we may use an apparatus of the type disclosed in the application Serial No. 790,487 filed February 2, 1959, for O. R. Etheridge, now U.S. Patent No. 3,101,284. In this apparatus, steam at super-atmospheric pressure is continuously mixed with the water-alcohol mixture containing the impure amylose in the throat of a steam jet. In this way the desired temperature is reached virtually instantaneously and a fluid solution is obtained in a matter of a few seconds. In the apparatus of the patent application referred to, the steam-heated suspension flows downward into, and through a detention zone where the hot suspension is maintained at an elevated temperature for a period of time that is selectable. This apparatus is so arranged and constructed that there is substantially no mixing in the detention zone in order that the amylose solution withdrawn from the bottom of the detention zone be maintained at a uniform temperature for a uniform length of time. Other forms of this type of apparatus may also be used for heating; for example, of the types disclosed in U.S. Patents Nos. 2,871,146; 2,582,198; and 2,805,966.

Other methods may be used in heating the water-alcohol mixture containing the impure amylose. We can employ an autoclave, or we can pump our mixture through a heat exchanger which comprises a coil of tubing in a constant temperature environment. In the latter, the length of the coil and the pumping rate can be used to control the time at temperature.

In the cooling step of our process, the fluid solution may be cooled at any suitable rate to the atmospheric boiling point of the water-alcohol mixture (approximately 200° F.). In order to avoid degradation of the amylose it is preferable to cool to the boiling point as rapidly as possible. When pressurized equipment is utilized, cooling to the boiling point can be accomplished by flashing the solution to atmospheric pressure or by quenching.

The second part of the cooling cycle is critical. Generally it is necessary in order to obtain satisfactory purification and recovery of amylose to maintain the mixture containing the impure amylose between its atmospheric boiling point and 120° F. for a period of at least 8 hours. While the material may be cooled rapidly to 120° F. and held at that temperature for a proper time, optimum purification and recovery of amylose is obtained by cooling the material slowly through the temperature range, preferably for a period of 18 to 48 hours.

During the cooling period agitation of the solution should be kept to a minimum to prevent the amylose from forming a gel.

As previously mentioned, after cooling below the boiling point of the alcohol water mixture, the mixture will form an upper alcohol layer and a lower water layer. This formation is usually complete in a matter of a few minutes. While the alcohol layer may be separated from the water layer at any convenient time, it is preferable in order to obtain optimum purification to separate the layers immediately after their formation is complete. At that time any undissolved solid material in the water layer can also be removed, utilizing such means as centrifugation or filtration. The lengthened cooling period is utilized to form solid amylose in the water layer. The solid amylose present in the separated water layer can then be recovered by any suitable means.

In our preferred method, less than 9% by weight impure amylose is employed in order to remove residual branched-chain material. The liquid phase of the water layer in which the solid amylose is suspended contains this dissolved material and this liquid can be separated from the solid amylose by any suitable means. Such means include centrifugation and/or filtration. Especially good separation is obtained using a high-speed centrifuge. The branched-chain material contained in the liquid phase of the water layer can then be recovered from the solution or it can be combined with previously separated solutions containing amylopectin to recover the total amylopectin. The solid amylose can then be dried by any suitable means;

for example by treatment with an organic dehydration solvent, vacuum drying, roll drying, spray drying, combinations of the aforementioned, or other methods of removing water. In order to obtain optimum purification it is preferable to treat the solid amylose with an organic dehydration solid in which amylose is insoluble, such as a lower ketone, for example methyl ethyl ketone or acetone or a lower alcohol, for example methanol, ethanol, propanol, or butanol. The lower ketones and methanol are found to be especially effective in our process. The solvent can then be removed from the solid amylose by any suitable means, for example by filtration or centrifugation followed by vacuum drying.

When the water layer containing the amylose is too viscous to separate branched-chain material, it is also preferable to employ a dehydration solvent.

In the alternative procedure of our invention, the fluid solution is cooled below its atmospheric boiling point to form an upper alcohol layer and a lower water layer. As previously mentioned, formation of the layers is completed in a matter of minutes and the water layer containing the amylose-rich fraction can be separated from the alcohol layer before solid amylose is formed. The amylose can then be precipitated with an organic water miscible solvent in which amylose is insoluble. Such solvents include pyridine, a lower alcohol, a lower ketone, etc. and the like. The organic solvent can then be removed from the precipitated amylose by any suitable means to obtain dry solid amylose. While the water layer may be cooled to obtain solid amylose and the solid amylose contained in the water layer can be treated with an organic, water-miscible solvent, this procedure is uneconomical since the principal advantage of the alternative procedure lies in elimination of the long cooling period.

The following examples illustrate the method of our invention, but they are not intended as a limitation of the invention.

In the examples referred to, several procedures for quantitatively determining impurities in amylaceous materials are employed. The amount of fatty materials is determined by the well-known "fat-by-hydrolysis" test which is described in the Kerr volume previously referred to on page 671. The nitrogen determination is made by the Kjeldahl method, most of the nitrogen being in the form of protein. The amount of cellulosic material and other insoluble debris is determined by dissolving a 1 gram sample of amylose in 100 ml. of a mixture consisting of 85 ml. of dimethyl sulfoxide and 15 ml. of water at 50° C. The material is then filtered and the filtered solids are washed with 10 ml. of aqueous dimethyl sulfoxide containing the same percentage of dimethyl sulfoxide as the 100 ml. mixture. The thus-obtained solid material is then dried under vacuum and weighed. The percent insolubles is calculated by using the following formula:

$$\frac{\text{weight of dried solids}}{\text{weight of amylose sample}} \times 100 = \text{percent insolubles}$$

The amount of inorganic material is determined by the well-known sulfate-ash test. Briefly, this test is conducted by treating a weighed sample of amylose with sulphuric acid and then heating the sample in a furnace at about 600° C. The incombustible residue which remains is then weighed. The percent of inorganic impurities, expressed as sulfate ash, is calculated using the following formula:

$$\frac{\text{weight of incombustibles}}{\text{weight of amylose sample}} \times 100 = \text{percent sulfate ash}$$

*Example I*

A sample of retrograded amylose obtained from corn starch according to the method of the Wagoner et al. patent was analyzed by the methods previously described and found to contain 1.28% fatty material, 0.13% nitrogen, 0.7% insolubles, and 0.42% inorganic impurities. Eight pounds of the sample were added to a mixture consisting of 92 lbs. water and 117 lbs. butanol and heated to about 190° F. in an open vessel. The resulting mixture was converted to a fluid solution by passing it under pressure through a coiled heat exchanger in a constant-temperature oil bath to obtain a solution temperature of 270° F. The heated fluid solution was then passed to a pressurized holding tank and retained in the holding tank at 270° F. for 1.9 minutes. The fluid solution was then removed from the holding tank and transferred to an insulated stainless steel vessel. Upon removal to atmospheric pressure the temperature of the solution fell to about 195° F. The fluid solution was cooled at a rate of 1.3° F. per hour to a temperature of about 137° F. At the end of 10 minutes of cooling, an upper butanol layer and a lower water layer had formed. The butanol layer which contained undissolved solids was separated from the water layer after 15 minutes of cooling by decantation. At the end of the cooling period, solid amylose was formed in the water layer. The material was then centrifuged using a high speed centrifuge to form a liquid phase and a solid phase. The liquid phase containing dissolved carbohydrates was separated by decantation from the solid phase. The solids material was then washed with acetone and filtered. The filtered solids were then rewashed with acetone and dried under vacuum to obtain dry solid amylose. The dried amylose was found to contain 0.07% fatty material, 0.03% nitrogen, 0.2% insolubles, and 0.09% inorganic impurities. This represents a fat removal of 94%, a nitrogen removal of 77%, and insoluble impurity removal of 70%, and an inorganic impurity removal of 79%.

*Example II*

Retrograded corn amylose was analyzed by the methods previously described and found to contain 1.58% fatty material, 0.11% nitrogen, 0.9% insoluble impurities and 0.35% inorganic impurities. 6.8 pounds of the material was added to a mixture consisting of 93.2 pounds of water and 16 pounds of butanol and heated to about 190° F. in an open vessel. The resulting mixture was converted to a fluid solution by passing it under pressure through a coiled heat exchanger to obtain a solution temperature of 300° F. The heated fluid solution was then passed to a pressurized holding tank and retained in the holding tank at about 300° F. for 4.0 minutes. The fluid solution was then removed from the holding tank and transferred to an insulated vessel. Upon removal to atmospheric pressure, the temperature of the solution fell to about 195° F. The fluid solution was cooled at a rate of 1.8° F. per hour to a temperature of about 130° F. At the end of about 6 minutes of cooling, an upper butanol layer and a lower water layer had formed. The butanol layer, which contained undissolved solids, was separated from the water layer after 10 minutes of cooling by decantation. At the end of the cooling period solid amylose was formed in the water layer. The material was then centrifuged using a high speed centrifuge to form a liquid phase and a solid phase. The liquid phase was separated by decantation from the solid phase. The solids material was then washed with acetone and filtered. The filtered solids were then rewashed with acetone and dried under vacuum to obtain dry solid amylose. The dried amylose was analyzed using the previously referred to methods and found to contain 0.06% fatty material, 0.02% nitrogen, 0.4% insoluble impurities and 0.19% inorganic impurities. This represents a fat removal of 96%, a protein removal of 82%, an insoluble impurity removal of 67% and an inorganic impurity removal of 50%.

*Example III*

Retrograded corn amylose was analyzed and found to contain 1.66% fatty materials. 6.0 pounds of the material was then added to a mixture consisting of 94.0 pounds water and 15 pounds butanol and heated to about 190° F. in an open vessel. The resulting mixture was converted to a fluid solution by passing it under pressure through a coiled heat exchanger to obtain a solution temperature of about 280° F. The heated fluid solution was then passed to a pressurized holding tank and retained in the holding tank at about 280° F. for about 5.0 minutes. The fluid solution was then removed from the holding tank and transferred to an open vessel. Upon removal to atmospheric pressure the temperature of the solution dropped to about 195° F. The fluid solution was allowed to stand for 5 minutes and during that period an upper butanol layer and a lower water layer were formed. The butanol layer was separated from the water layer by decantation. The separated water layer was then immediately added to 200 pounds of acetone and solid amylose was precipitated from the acetone-water mixture. The precipitated amylose was filtered and then washed with acetone. The acetone washed material was filtered and dried under vacuum to obtain solid amylose. The solid amylose was analyzed and found to contain 0.47% fat. This represents a fat removal of 72%.

*Example IV*

A 5.7 pound sample of retrograded corn amylose was combined with a mixture consisting of 17.2 pounds of butanol and 77.1 pounds of water. The resulting mixture was heated to about 190° F. in an open vessel and then converted to a fluid solution by passing it under pressure through a coiled heat exchanger to obtain a solution temperature of 310° F. The heated fluid solution was then passed to a pressurized holding tank and retained in the holding tank at about 310° F. for 6.0 minutes. The fluid solution was then removed from the holding tank and transferred to an insulated vessel. Upon removal to atmospheric pressure, the temperature of the solution dropped to about 195° F. The fluid solution was then slowly cooled for about 18 hours to about 130° F. After about 10 minutes of cooling an upper butanol layer and a lower water layer were formed. The butanol layer, which contained undissolved solids, was separated by decantation from the water layer after 15 minutes of cooling. At the end of the cooling period the solid material was formed in the water layer. The material was then centrifuged using a high speed centrifuge to form a liquid phase and a solid phase. The liquid phase was separated from the solid phase by decantation. The solid material was dried under vacuum to obtain solid amylose. The liquid phase was evaporated to dryness to obtain 0.54 pound of branched-chain material. This example demonstrates the effectiveness of our process in recovering branched-chain material from amylose rich solids containing unseparated amylopectin.

Now having described our invention, what we claim is:

1. A process for purifying retrograted amylose which consists essentially of effecting a fluid solution of retrograded amylose in a mixture consisting essentially of water and a member selected from the group consisting of alcohols having 4 to 6 carbon atoms inclusive, at a temperature ranging from about 250° F. to temperatures at which amylose tends to degrade, the time at the said temperature being limited to avoid substantial degradation of the amylose, the proportions of water and alcohol in the said mixture being such that a separable water layer and a separable alcohol layer can be formed at a temperature below the atmospheric boiling point of the water-alcohol mixture and above 120° F., the amount of impure retrograded amylose dry substance being not more than about 15% by weight based on the weight of the water in the water-alcohol mixture, cooling the said fluid solution to below the atmospheric boiling point of the water-alcohol mixture and about 120° F., maintaining the said fluid solution between about 120° F. and the boiling point of the said mixture for a period of time sufficient to form an upper separable alcohol layer and a lower separable water layer, separating the said alcohol layer from the said water layer and recovering substantially fat-free amylose from the water layer.

2. A process for purifying retrograded amylose which comprises effecting a fluid solution of retrograded amylose in a mixture consisting essentially of water and an alcohol selected from the group consisting of alcohols having from 4 to 6 carbon atoms inclusive, at a temperature ranging from about 250° F. to temperatures at which amylose tends to degrade, the time at the said temperature being limited to avoid substantial degradation of the amylose, the proportions of water and alcohol in the said mixture being such that a separable water layer and a separable alcohol layer can be formed at a temperature below the atmospheric boiling point of the water-alcohol mixture and above about 120° F., the amount of impure amylose dry substance being not more than about 15% by weight based on the weight of the water in the water-alcohol mixture, cooling the said fluid solution to below the atmospheric boiling point of the water-alcohol mixture and above 120° F., maintaining the said fluid solution between about 120° F. and the said boiling point for a period of time sufficient to form an upper separable alcohol layer and a lower separable water layer and a period of time sufficient to form and to grow separable solid amylose in the water layer, separating the water layer containing the amylose from the alcohol layer and recovering substantially purified amylose from the water layer.

3. The process of claim 2 wherein the amount of retrograded amylose is not more than 9% and the amount of alcohol is not less than 8% by weight, the weights based on the weight of the water.

4. The process of claim 3 wherein the temperature to which the water-alcohol mixture containing the amylose is heated ranges from 270 to 320° F.

5. The process of claim 3 wherein the alcohol is butanol.

6. A process for purifying retrograded amylose which comprises effecting a fluid solution of retrograded amylose in a mixture consisting essentially of water and an alcohol selected from the group consisting of alcohols having from 4 to 6 carbon atoms inclusive, at a temperature ranging from about 250° F. to temperatures at which amylose tends to degrade, the time at the said temperature being limited to avoid substantial degradation of the amylose, the proportions of water and alcohol in the said mixture being such that a separable water layer and a separable alcohol layer can be formed at a temperature below the atmospheric boiling point of the water-alcohol mixture and above about 120° F., the amount of impure amylose dry substance being not more than about 9% by weight based on the weight of the water in the water-alcohol mixture, cooling the said fluid solution to below the atmospheric boiling point of the water-alcohol mixture and above 120° F., maintaining the said fluid solution between about 120° F. and the said boiling point for a period of time sufficient to form an upper separable alcohol layer and a lower separable water layer and a period of time sufficient to form and grow separable solid amylose in the water layer, separating the water layer containing the amylose from the alcohol layer, separating the solid amylose from the liquid phase portion of the water layer, treating the solid amylose with an organic dehydration solvent in which amylose is insoluble, and separating the dehydration solvent from the amylose to obtain substantially purified amylose.

7. The process of claim 6 wherein the amount of impure amylose ranges from about 3 to about 7% by weight and the amount of alcohol ranges from about 12 to about 25% by weight, the weights based on the weight of the water in the water-alcohol mixture.

8. The process of claim 7 wherein the dehydration solvent is acetone.

9. The process of claim 7 wherein the alcohol is butanol.

10. A process for purifying retrograded amylose which comprises effecting a fluid solution of retrograded amylose in a mixture consisting essentially of water and an alcohol selected from the group of alcohols having from 4 to 6 carbon atoms inclusive, at a temperature ranging from about 250° F. to temperatures at which amylose tends to degrade, the time at the said temperature being limited to avoid substantial degradation of the amylose, the proportions of water and alcohol in the said mixture being such that a separable water layer and a separable alcohol layer can be formed at a temperature below the boiling point of the water-alcohol mixture and above about 120° F., the amount of retrograded amylose dry substance being not more than about 15% by weight based on the weight of the water in the water-alcohol mixture, cooling the said fluid solution to below the boiling point of the water-alcohol mixture and above 120° F., maintaining the said fluid solution between about 120° F. and the said boiling point for a period of time sufficient to form an upper separable alcohol layer and a lower separable water layer, separating the water layer containing the amylose from the alcohol layer, treating the water layer with an organic water-miscible solvent in which amylose is insoluble to precipitate solid amylose and recovering substantially purified amylose.

11. The process of claim 10 wherein the amount of alcohol ranges from about 12 to about 25% by weight based on the weight of the water.

12. The process of claim 11 wherein the alcohol is butanol.

No references cited.

MORRIS O. WOLK, *Primary Examiner.*

E. G. WHITBY, *Assistant Examiner.*

UNITED STATES PATENT OFFICE
CERTIFICATE OF CORRECTION

Patent No. 3,255,042　　　　　　　　　　　　　　　June 7, 1966

Robert A. Schnell et al.

It is hereby certified that error appears in the above numbered patent requiring correction and that the said Letters Patent should read as corrected below.

Column 6, line 1, for "117 lbs." read -- 17 lbs. --; column 7, line 69, for "about" read -- above --.

Signed and sealed this 26th day of September 1967.

(SEAL)
Attest:

ERNEST W. SWIDER　　　　　　　　　　　　　　　EDWARD J. BRENNER
Attesting Officer　　　　　　　　　　　　　　　　Commissioner of Patents